Sept. 1, 1970  G. A. MIXON  3,526,077
APPARATUS FOR PACKAGING MEAT AND LIKE PRODUCTS
Filed Oct. 25, 1968  5 Sheets-Sheet 1

INVENTOR
GEORGE A. MIXON
BY
Howson & Howson
ATTYS

Sept. 1, 1970          G. A. MIXON          3,526,077
APPARATUS FOR PACKAGING MEAT AND LIKE PRODUCTS
Filed Oct. 25, 1968          5 Sheets-Sheet 2
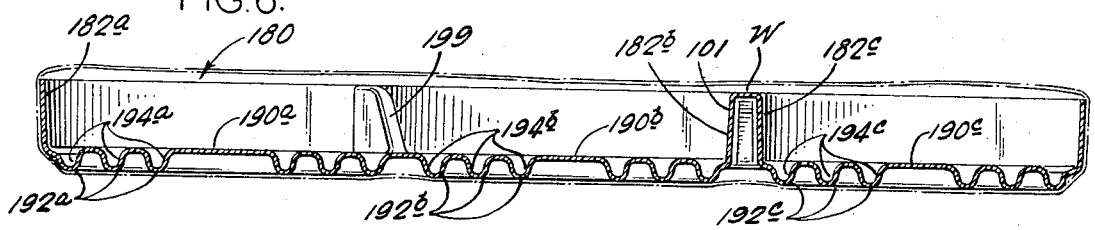
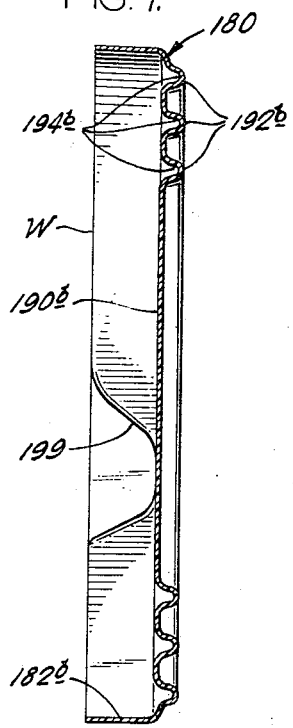
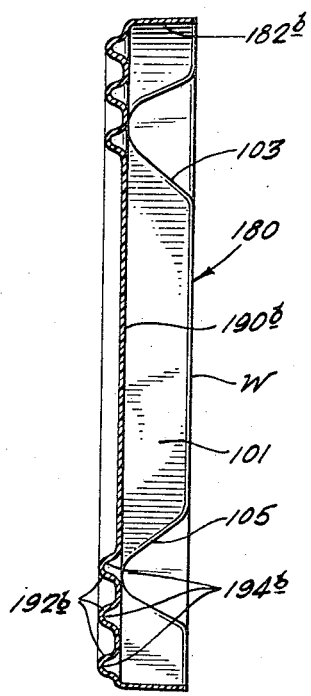
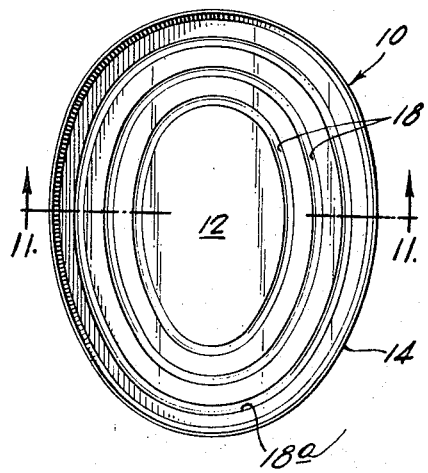
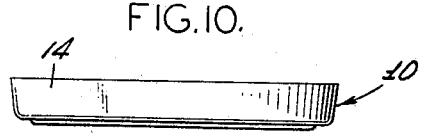
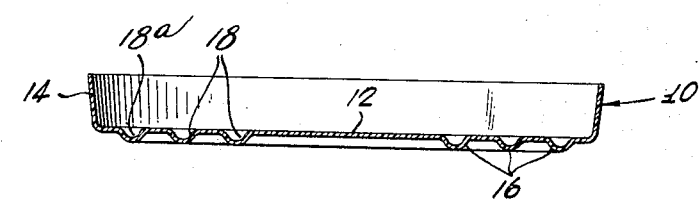
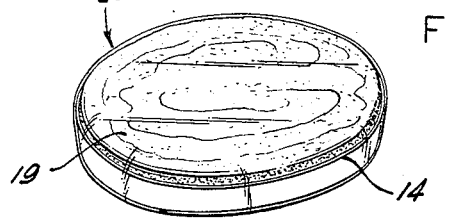
INVENTOR:
GEORGE A. MIXON
BY Howson & Howson
ATTYS.

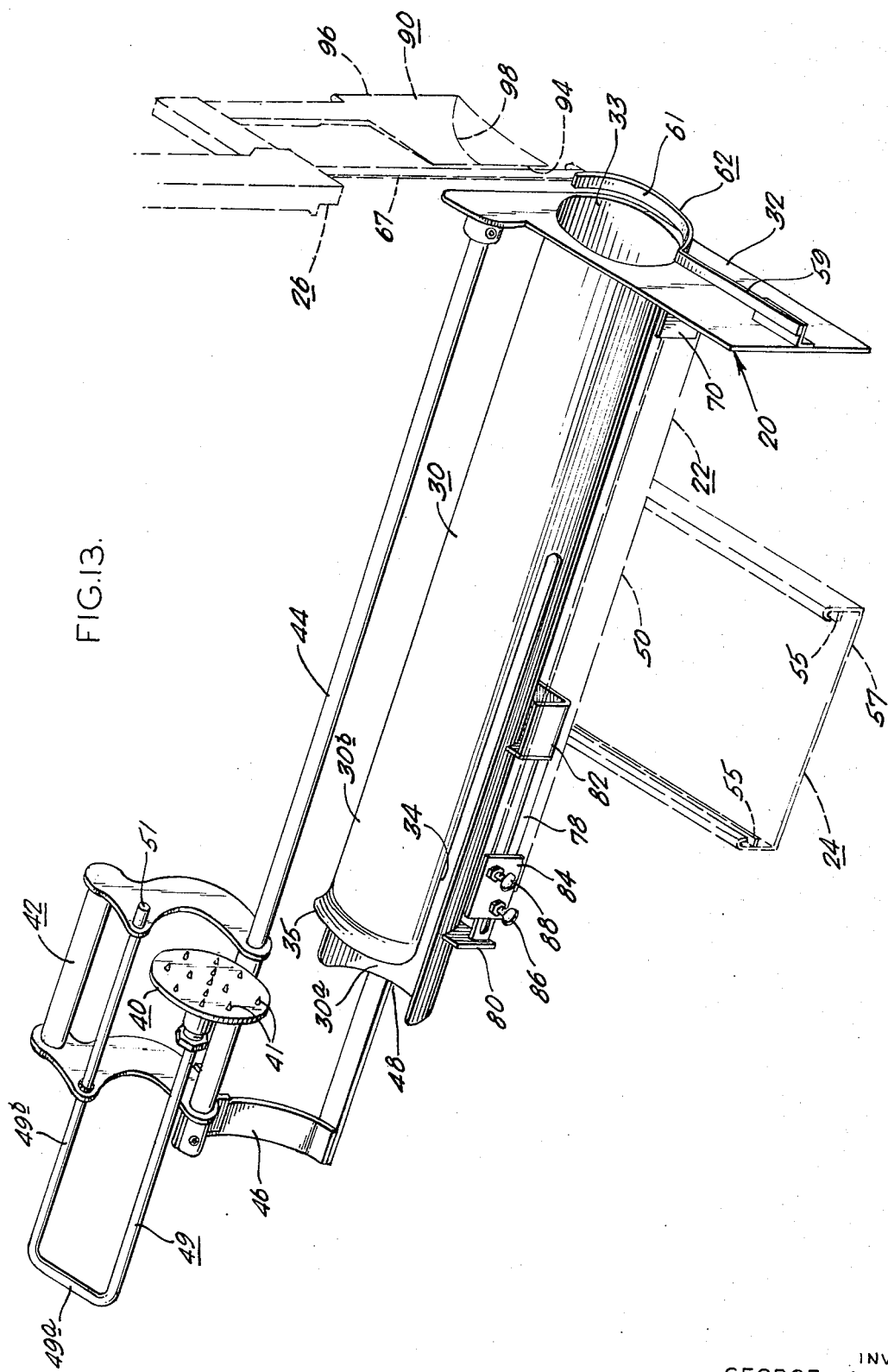

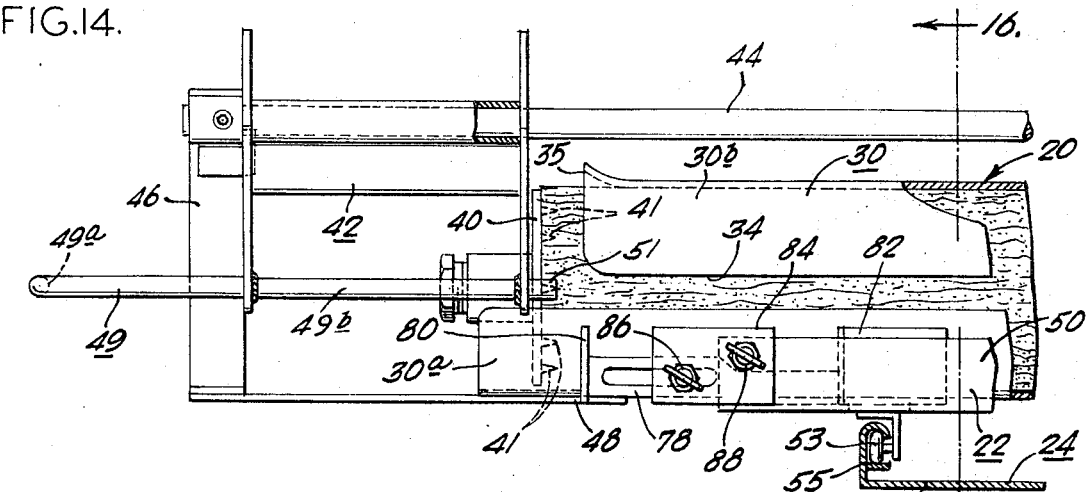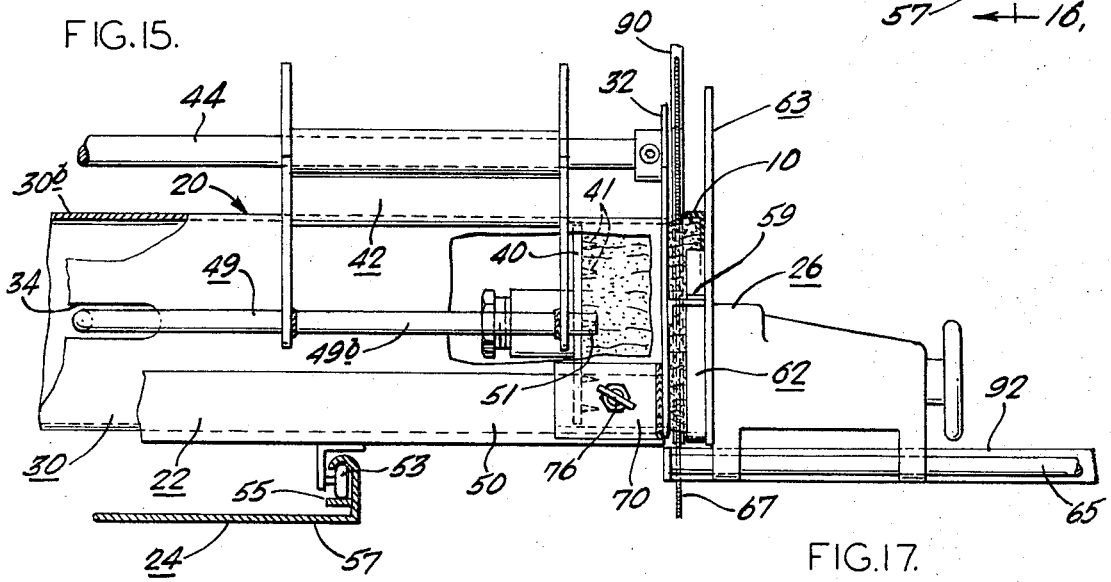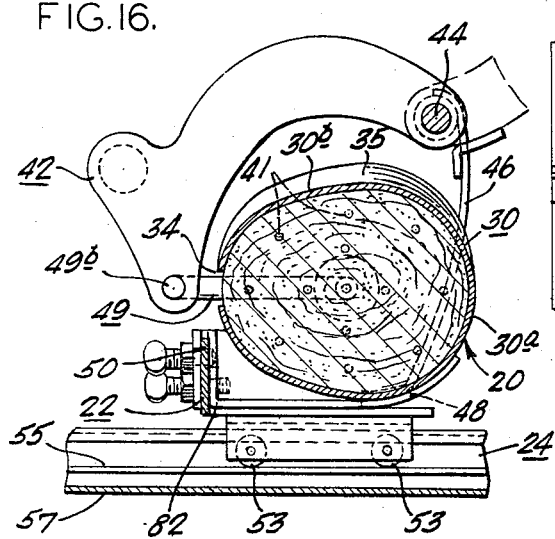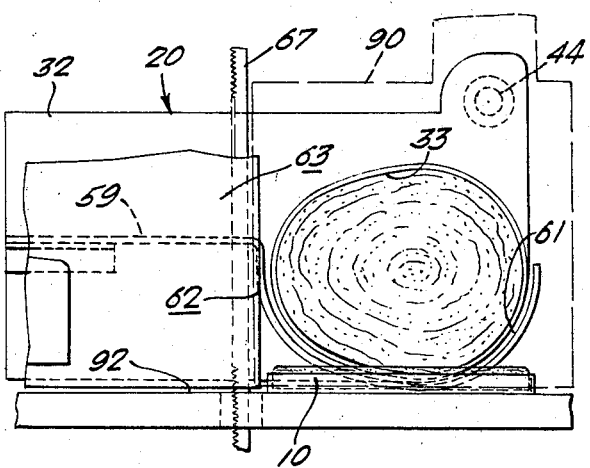

Sept. 1, 1970 G. A. MIXON 3,526,077
APPARATUS FOR PACKAGING MEAT AND LIKE PRODUCTS
Filed Oct. 25, 1968 5 Sheets-Sheet 5
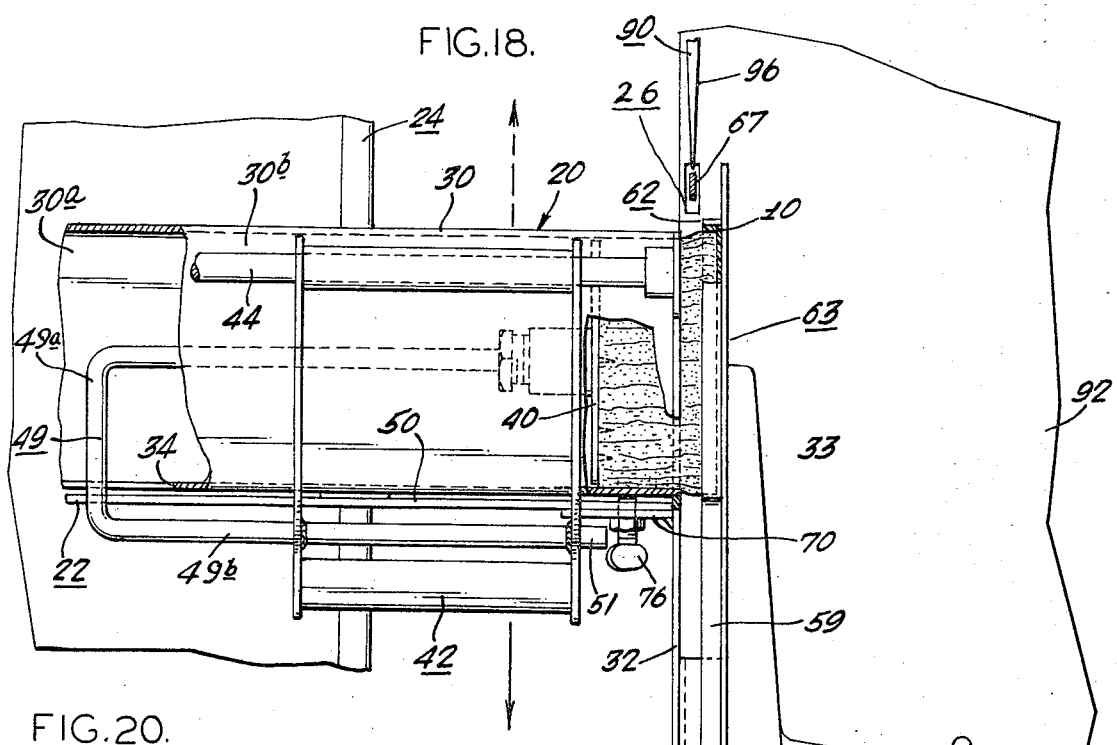
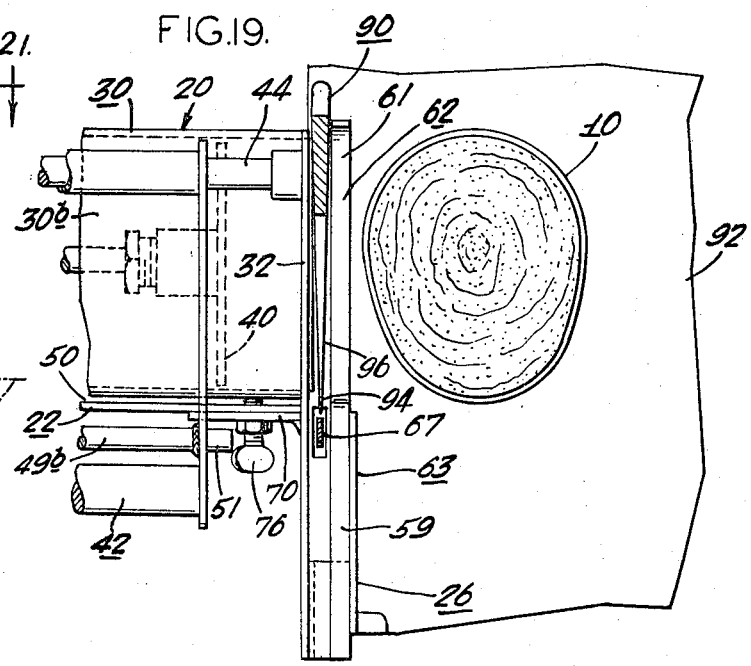
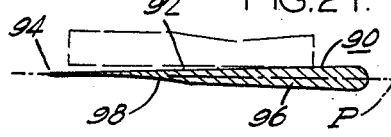
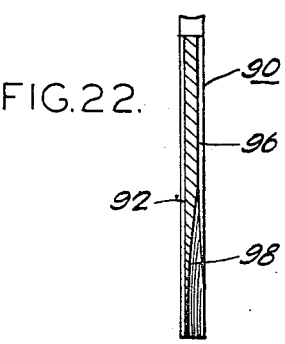
INVENTOR:
GEORGE A. MIXON
BY Howson & Howson
ATTYS

United States Patent Office 3,526,077
Patented Sept. 1, 1970

3,526,077
APPARATUS FOR PACKAGING MEAT AND LIKE PRODUCTS
George A. Mixon, Fort Lauderdale, Fla., assignor to Mol-Pak Corp., Fort Lauderdale, Fla., a corporation of Florida
Continuation-in-part of application Ser. No. 479,949, Aug. 16, 1965. This application Oct. 25, 1968, Ser. No. 770,530
Int. Cl. A22c 7/00; B65b 25/06, 39/14
U.S. Cl. 53—123                      6 Claims

ABSTRACT OF THE DISCLOSURE

A method for packaging meat products and the like consisting of the steps of slicing a cut of meat of predetermined size and shape, positioning the cut of meat in a tray having at least one cavity section with a sidewall slightly smaller than the thickness of the cut and a base conforming generally to the cross section of the cut so that the cut of meat fits snugly therein, enveloping the tray and cut in a heat shrinkable filmy material and freezing the packaged meat product, an apparatus for packaging cuts of an elongated meat product and the like in open trays comprising an elongated hollow tubular member of a predetermined cross section conforming generally to the cross section of the elongated meat product, plunger means engageable in one end of the tubular member to advance the meat product longitudinally therein toward the discharge end, a tray support member adjacent the discharge end for mounting a tray in a vertical position to receive a cut of the meat product therein, stationary back-up means supporting the tray in a vertical receiving position at the discharge end of the tubular member, cutting means and means for actuating the tubular member relative to the cutting means to sever a cut of meat from the main portion.

---

This is a continuation-in-part application of my prior application Ser. No. 479,949 filed Aug. 16, 1965 for "Method of Standardizing Solid Meat Portions," now abandoned.

The present invention relates to improvements in method and apparatus for packaging meat products and the like. More particularly, the present invention provides an efficient and economical manner of packaging meat products wherein all of the meat portions are of substantially the same size and weight and are frost free to preserve the natural and appealing appearance of the meat product.

In some retail operations, for example large food chain stores, meat and like products are pre-cut, packaged, weighed and priced and then placed in a refrigeration unit in the store for self-service removal by the customer. In some instances, several cuts of meat are placed in overlapping relation on a flat cardboard plate, the plate and meat are enveloped in an overwrap of a filmy material such as cellophane and thereafter the packages are frozen by conventional means in a blast tunnel. This technique is commonly referred to as "shingle packaging." Several problems are noted in connection with packaging the meat products in this fashion. For example, there is a considerable amount of air space in the package which during the freezing period results in dehydration, freezer burns and formation of frost on the inside of the package. This, of course, makes it difficult for the consumer to examine the entire meat product. Furthermore, in some instances it has been observed that the meat product discolors and tends to lose its natural appearance. In some instances the meat product deteriorates to a point where it is not suitable for prime consumer use and, even in instances where it is suitable for such use, the unappealing character of the product has lost its eye appeal. Additionally, weighing and pricing of each package is time consuming.

The present invention overcomes some of the problems of prior packaging techniques and in general is much more economical. In accordance with the present invention, an elongated section of a meat product, for example an eye roast, is divided into a plurality of cuts or pieces of substantially the same size and weight. Thereafter, each piece is placed into a container or tray having a bottom wall conforming generally to the peripheral shape of the cut and an upstanding sidewall. The sidewall of the tray is of a height slightly smaller than the thickness of the cut so that when the meat cut is placed in the container, it extends slightly above the upper edge of the sidewall of the tray. The base of the tray is provided with a plurality of spaced grooves providing channels wherein the meat juices migrate. By this arrangement when the film is placed over the top of the container and shrunk to snugly embrace the top of the meat and thereafter frozen, the package has a frost free appearance. Additionally, since the meat juices are remote from the filmy material, the upper surface retains its natural appearance, and thus the entire package is more appealing to the consumer. More specifically, by the present invention the meat cut fits snugly in the tray by reason of the configuration of the tray and the compression of the meat product during the film shrinking process. Therefore, by eliminating air space and also by providing a reservoir for the meat juices, there is no dehydration or freezer burning of the meat and a resultant frost free package. Preferably, the trays are translucent so that complete examination of the meat product is possible by the consumer, as contrasted with prior packaging arrangments wherein only the top surface of the meat is visible. The present invention also provides apparatus for automatically cutting and filling the trays so that each of a plurality of trays is substantially the same weight, thereby obviating the need for weighing and pricing each package.

These and other objects of the present invention and various features and details thereof are hereinafter more fully set forth with reference to the accompanying drawings, wherein:

FIG. 1 is a perspective view of a packaged meat product in one form of tray or container in accordance with the present invention;
FIG. 2 is a plan view of the container shown in FIG. 1 with the outer cover or bag shown in broken lines;
FIG. 3 is a side view of the assembly shown in FIG. 2 illustrating schematically the means for sealing the end of the bag member;
FIG. 4 is an end view of the tray shown in FIG. 2;
FIG. 5 is a bottom view of the tray shown in FIG. 2;
FIGS. 6, 7 and 8 are enlarged sectional views taken on lines 6—6, 7—7 and 8—8 of FIG. 2;
FIG. 9 is a top plan view of another form of tray in accordance with the present invention;
FIG. 10 is an end view of the tray shown in FIG. 9;
FIG. 11 is an enlarged sectional view taken on lines 11—11 of FIG. 9;
FIG. 12 is a perspective view of a meat product packaged in a tray of the type shown in FIG. 9;
FIG. 13 is a perspective view of the apparatus in accordance with the present invention for packaging meat or like products;
FIG. 14 is a fragmentary side view of a position of the rear terminal end of the apparatus;
FIG. 15 is a fragmentary side elevational view of the forward end of the apparatus;
FIG. 16 is a sectional view taken on lines 16—16 of FIG. 14;

FIG. 17 is a fragmentary end view of the apparatus;

FIG. 18 is a fragmentary plan view of the apparatus showing the position of the various elements just prior to separating a cut of the meat product from the main portion;

FIG. 19 is a fragmentary plan view showing the position of the parts after slicing a cut from the main portion;

FIG. 20 is a side elevational view of the wedge member; and

FIGS. 21 and 22 are sectional views taken on lines 21—21 and 22—22 of FIG. 20.

Figure 1:
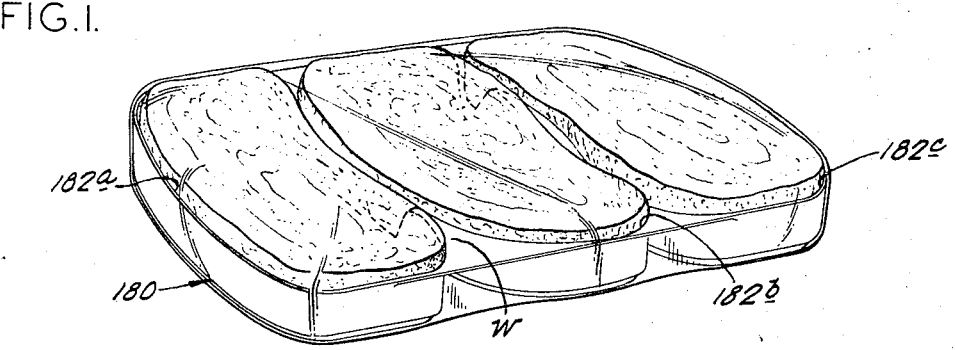
Figure 2:
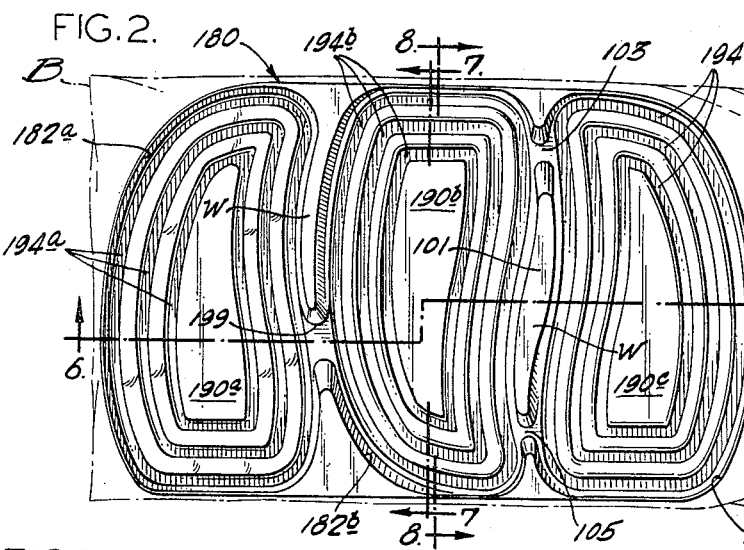
Figure 4:
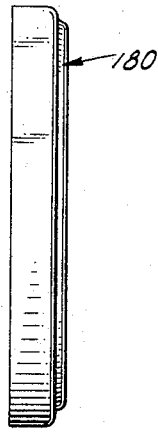
Figure 3:
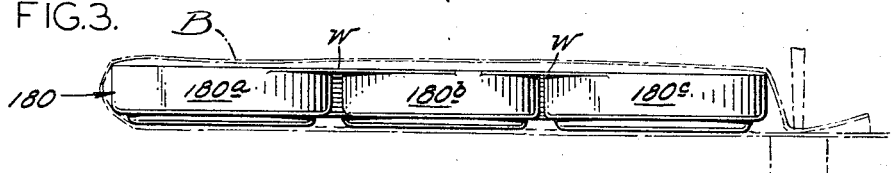
Figure 5:
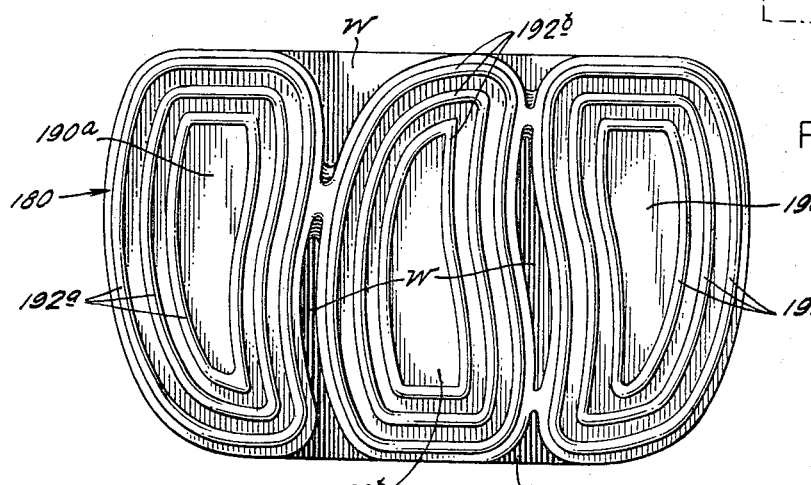

The present invention contemplates packaging of meat or like products in containers in such a manner that the packaged products are of substantially the same size and weight and the package presents a frost free appearance so that it is appealing to look at and also may be examined by the purchaser. To this end considering for example the packaging of cuts of a rib eye, the elongated piece of meat is cut into a plurality of sections or cuts of a predetermined weight and each section of cut is placed into a container, for example of the type shown in FIG. 9. Thereafter, a film preferably of a pliable and transparent material is placed loosely over the open end of the container in contact with the exposed surface of the meat. The package is then exposed to a temperature high enough to cause the film to shrink so that it fits tightly and in smooth contact over the upper surface of the meat. In accordance with one form of the method of the present invention, the filled trays are placed in bags B made of a heat shrinkable film material, the open end of the bag is sealed by conventional heat pressure sealing apparatus of the type illustrated in FIG. 3, and thereafter heat shrunk in the manner described above. In lieu of the bag, the tray may be passed between sheets of heat shrinkable material which are cut and sealed to envelope the filled tray.

One form of container or tray suitable for packaging meat products or the like in the manner described above is illustrated in FIGS. 9–12 inclusive. The tray which is generally designated by the numeral 10 includes a generally oval-shaped base 12 and an upstanding sidewall 14 extending from the peripheral edge of the base 10. The base in the present instance has a series of continuous annular spaced apart ribs 16 defining a plurality of spaced channels 18, the outer channel 18a being spaced from the peripheral sidewall 14. By this arrangement when the meat cut, for example, a slice of rib eye is placed in the container, the thickness of the cut is such that it extends slightly above the upper peripheral edge of the sidewall 14. Preferably, the tray is made of a translucent material. Thus, when the filled container 10 is enveloped in the heat shrinkable film material which in the present instance is in the form of a bag 19 and shrunk, the film snugly embraces the container and compresses the meat cut slightly therein. Additionally, the meat juices migrate to the channels 18 which serve as a reservoir to prevent clouding of the film during the freezing operation. As noted above, the complete package assembly is substantially devoid of air space whereby the natural pleasing appearance of the meat product is preserved and the packages are in a frost free condition. Additionally, the ribs serve as strengthening members to prevent the package from buckling during shipment and handling.

In view of the above, it is clear that the present invention provides a novel and useful improvement in the packaging of meat and like products. The particular manner in which trays are filled and the configuration and arrangement of the trays insures a frost free package whereby the product may be examined in its entirety by the consumer. In accordance with the present invention the natural pleasing appearance of the meat product is retained as well as the natural meat juices. Furthermore, with the present invention, meat products may be packaged very rapidly since weighing and pricing of each package is obviated.

There is illustrated in FIGS. 13–19 apparatus for packaging meat or like products in accordance with the present invention. As illustrated, the apparatus includes a meat holder or support assembly generally designated by the numeral 20 including a carriage 22 which rides on a track member 24 so that the entire assembly may be actuated relative to a cutter 26 to slice successive cuts or portions of meat in a manner described in more detail hereafter. The meat holder assembly as best illustrated in FIG. 13 includes an elongated hollow tubular member 30 which at its discharge end mounts an end plate 32 having a discharge opening 33 therein of generally the same cross section as the tubular member 30, in the present instance oval-shaped to accommodate a section of eye roast. As illustrated in FIGS. 16 and 18 the sidewall of the tubular member 30 is provided with a longitudinal slot 34 extending inwardly from the inner terminal entrance end of the tubular member to provide a degree of flexibility when the meat section is inserted therein. The lower portion 30a of the tubular member extends slightly beyond the inner edge of the upper portion 30b to provide a deck for loading, the upper portion 30b having a flared edge 35 to facilitate insertion of the piece of meat.

The apparatus includes means for advancing the meat through the tubular member including, in the present instance, a piston-like plunger 40 having a plurality of pointed gripping members 41 and being of a cross section slightly smaller than but of substantially the same cross section as the tubular member. The piston plunger is actuatable transversely relative to the tubular member 30 by means of a handle 42 slidably mounted on a rod 44 supported at one end on the front end plate 32 and its opposite end on a bracket 46 secured to the tubular member as at 48. The handle 42 mounts a generally U-shaped support rod 49 for the piston plunger so that it may be advanced interiorly of the tubular member. It is noted that the U-shaped configuration of the support rod 49 permits actuation of the plunger in the tubular member from the entrance end to the discharge end, the base 49a of the U-shaped rod entering the slot 34 in the sidewall of the tubular member when the piston is in its fully extended forward position adjacent the discharge end as shown in FIG. 18. One leg 49b of support rod 49 extends beyond the handle 42 to serve as a bumper 51 limiting forward movement of the piston at its forward limit position.

The meat holder assembly is adapted for mounting on a conventional carriage 50 having rollers 53 engageable in the trackway 55 of bed 57. Thus, as illustrated in FIGS. 15 and 18, a bracket 70 is mounted on the back face of the end plate 32 which has an opening to receive a thumb screw 76 to secure the meat holder assembly to the carriage 50. Adjustment means is provided at the opposite end of the tubular member 30 to permit it to be secured to carriages of various sizes. More specifically, the adjustment means includes a rod 78 carried by brackets 80 and 82 mounted on the lower side of the tubular member 30 and an adjusting plate 84 mounting two adjusting screws 86 and 88 adapted to engage the rod and end flange of the carriage respectively.

The meat holder assembly further includes a tray support member adjacent the discharge end for supporting a tray of the type described above in position adjacent the discharge opening to receive a cut of meat therein. The tray support member in the present instance is mounted on the front face of the end plate member 32 in spaced relation thereto to permit engagement of the cutting device in the manner described in more detail below. The tray support member has a finger portion 59 and an arcuate cradle 61 conforming generally to a portion of the tray so that the tray nests therein.

Tray 10 is held in a vertical position on the cradle 61 of tray holder 62 by cutting guide 63 which is adjustable along rod 65 to vary the thickness of the cut of meat.

In the position illustrated in FIGS. 15 and 18 the meat is ready to be passed through the cutting blade 67.

The meat cutting guide 63 in the present instance serves as a back up plate for the tray in the loading position illustrated in FIG. 18.

With the various elements of the apparatus in the position illustrated in FIG. 18, as the meat holder assembly is moved to its forward limit position, in direction of dashed arrow, the cutting blade 67 slices a cut of meat. Simultaneously, the tray is moved beyond the outer extremity of the back up plate of cutting guide 63 whereby it is turned face up by wedge guide member 90 onto the table top 92, as shown in FIGS. 17 and 19. The table top 92 may have a moving belt-type conveyor to carry the filled trays to another location for further processing. The meat holder assembly is now retracted in the direction of the solid line arrow to a position where the cradle is clear of the cutting guide 63 to facilitate loading of the next tray prior to movement of the meat holder assembly in the opposite direction to start a new cycle.

In the present instance a wedge-shaped guide member 90 is aligned with and mounted behind the cutter blade 67. The guide member serves to pivot the filled tray when the meat holder assembly has been actuated to a point wherein the cut of meat has been severed from the main portion as described above. The wedge-shaped guide member wedges the meat back into the tubular holder 30 slightly to afford clearance for the cutting blade 67 and preclude jamming upon retraction of the meat holder assembly for the next cut.

The specific configuration of the wedge-shaped guide member is best illustrated in FIGS. 20–22 inclusive. As illustrated therein, the guide member is of generally rectangular shape and has a rear face confronting the discharge opening in the meat holder assembly that is disposed at an angle relative to a plane P through the center line of the wedge, which plane P is disposed perpendicularly to the axis of the tubular member 30. By this construction as the meat holder assembly is moved past the cutting blade 67, the tapered rear face 92, because of its tapered configuration, exerts increased pressure on the end of the meat into the tubular member 30. The lead edge 94, which is aligned with the cutting blade 67, is of a width no greater than the thickness of the blade. The front face 96 has a contoured portion generally designated by the number 98, which curves downwardly and outwardly as illustrated in FIGS. 20 and 22. By this configuration the tray is rolled to a face up position on the table 92 in the manner described above.

Considering now briefly the use and operation of the apparatus described above, assume the plunger piston assembly 40 is in a retracted position away from the entrance end of the tubular member 30. In this position a piece of meat, for example an eye roast, is placed on the deck 30a and moved longitudinally into the holder 30. The meat is then pushed into the tubular member to a point where a small portion thereof extends beyond the discharge end.

Piston assembly 40 is then rotated by means of handle 42 about rod 44 so that the piston member 40 with prongs 41 attached thereto is in alignment with the end of the meat cut. Piston 40 is then moved toward the meat by means of handle 42 until the spikes 41 enter the end of the meat. With a tray placed in the cradle 61 and with meat guide in position behind the tray as shown in FIGS. 6 and 7, when the meat is moved by the force of piston 40 pushing against it the opposite end of the meat enters tray.

Since tray is slightly larger and of substantially the same shape as the meat, and since pressure is being exerted on the meat from the opposite end, the meat will contact the bottom of tray and fill the same. After the tray is filled in this manner, the meat holder assembly is moved along trackway 55 until it contacts cutting blade 67. As it is moved farther, the meat passes beyond cutting blade 67 and in so doing the meat within tray is severed from the main body portion.

As stated above, once the meat holder assembly passes beyond cutting blade 67 the vertical support 63 is cleared and the filled tray is pivoted by guide wedge to table 92. The filled tray may then be removed by any suitable means to a remote location.

The device may then be moved back on track 55 to a position to receive another empty tray. The meat may then be moved into the new tray and the complete cycle as described above may be repeated.

Automatic feed means may be provided to successively feed empty trays to the meat holder apparatus. Further, even though the apparatus is described in connection with a single cavity tray, it is to be understood that multi-cavity trays or containers may also be used by modifying the apparatus to include a plurality of tubular members or to provide means at the discharge end for indexing a multi-cavity tray to fill all the cavities thereof.

There is illustrated in FIGS. 1–8 a multi-cavity tray 180 constructed in accordance with the present invention. The tray 180 is of one piece design and is intended for use, for example, for boneless cuts of pork. The tray 180 has in the present instance three side-by-side cavities 182a, 182b and 182c, each cavity having a base portion 190a, 190b and 190c conforming generally to the periphery of the meat cut. Each base portion, for example for the cavity 182a, has a series of continuous ribs 192a defining channels 194a for receiving meat juices as described above in connection with the single cavity tray. In the present instance each cavity has its own peripherally extending sidewall which is not continuous but is interrupted to provide relief openings providing strengthening bridges between adjacent cavities. For example, a single passageway opening 199 is provided between cavities 182a and 182b and a separate wall section 101 is provided between cavities 182b and 182c which, as illustrated, is spaced from the main wall sections to define two passageways 103 and 105. The upper edge of adjacent sidewalls of the cavity sections are connected by means of webs W for strength purposes.

I claim:

1. An apparatus for packaging cuts of an elongated meat product and the like in open trays comprising an elongated hollow tubular member having a discharge end and being of a predetermined cross section conforming generally to the cross section of the elongated meat product, a tray support member adjacent the discharge end for mounting a tray with its open side confronting and in registry with said discharge end to receive a cut of the meat product therein, said tray support member being spaced from the discharge end of said tubular member to provide clearance for the cutting means, plunger means engageable in one end of the tubular member to advance the meat product longitudinally therein toward the discharge end thereby to press the meat product into said tray to completely fill the same, means for actuating said tubular member relative through a cutting zone and a discharge zone, cutting means disposed adjacent the line of movement of the discharge end of said tubular member, said meat product being engaged by said cutting means during actuation through said cutting zone to sever a cut of the meat product, back up means confronting and supporting the tray in a position over the discharge end of said tubular member during actuation of said tubular member through the cutting zone, said tubular member being positioned beyond said back up means upon actuation through said discharge zone to permit removal of a filled tray, said back up means being selectively adjustable longitudinally relative to said tubular member whereby the thickness of a cut of the meat product may be selectively varied.

2. Apparatus as claimed in claim 1 wherein the inner terminal end of the tubular member opposite the discharge end is divided into upper and lower portions by a longitudinally extending slot providing a degree of flexibility for insertion of the elongated meat product, the lower portion extending slightly beyond the inner edge of the upper portion to provide a deck for loading and the upper portion having a flared edge.

3. Apparatus as claimed in claim 1 wherein the plunger means is actuatable by means of a handle slidably mounted on a rod extending generally parallel to the tubular member and connected to the plunger by a U-shaped support member.

4. Apparatus as claimed in claim 1 wherein the tray support member includes a finger portion secured at one end to the end plate mounted at the forward end of the tubular member and an arcuate cradle of a configuration to closely conform to the sidewall portion of a tray so that it nests therein.

5. Apparatus as claimed in claim 1 including a wedge-shaped guide member aligned with and mounted behind said cutting means operable when said tubular member is actuated through said discharge zone to pivot a filled tray face up on a table and simultaneously press the meat product in a rearward direction in said tubular member to prevent jamming of the cutting means on the end face of the meat product when the tubular member is being returned to a position for actuation through the cutting zone.

6. Apparatus as claimed in claim 5 wherein the guide member is of generally rectangular shape having a rear face confronting the discharge opening in the tubular member that is angularly disposed relative to a plane perpendicular to the axis of the tubular member, the front face having a contoured section curving downwardly and outwardly from the front edge of the wedge adjacent the cutting means.

References Cited

UNITED STATES PATENTS

| | | | |
|---|---|---|---|
| 1,736,257 | 11/1929 | Douglass | 53—123 |
| 1,984,064 | 12/1934 | Greco | 53—123 |
| 2,092,773 | 9/1937 | Nordquist | 53—123 |
| 2,092,786 | 9/1937 | Taylor | 53—123 X |
| 2,851,836 | 9/1958 | Fromwiller | 53—123 X |
| 2,911,776 | 11/1959 | Sada | 53—123 X |
| 2,977,732 | 4/1961 | Leonard | 53—124 |
| 3,010,499 | 11/1961 | Dahms | 53—123 X |
| 3,129,546 | 4/1964 | Redmond | 53—123 X |
| 3,385,208 | 5/1968 | Clegg | 53—124 |
| 3,415,663 | 12/1968 | Raschke | 99—174 |
| 3,462,793 | 8/1969 | Sumption | 99—174 X |

WAYNE A. MORSE, Primary Examiner

U.S. Cl. X.R.

53—124; 99—174